(12) United States Patent
Denz

(10) Patent No.: US 12,728,763 B2
(45) Date of Patent: Sep. 8, 2026

(54) CONTROL DEVICE FOR AN ELECTRIC VEHICLE, ELECTRIC VEHICLE AND METHOD FOR CONTROLLING THE ENERGY OUTPUT OF AN ELECTRIC VEHICLE

(71) Applicant: Robert Bosch GmbH, Stuttgart (DE)

(72) Inventor: Holger Denz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 18/712,109

(22) PCT Filed: Oct. 17, 2022

(86) PCT No.: PCT/EP2022/078785
§ 371 (c)(1),
(2) Date: May 21, 2024

(87) PCT Pub. No.: WO2023/099073
PCT Pub. Date: Jun. 8, 2023

(65) Prior Publication Data

US 2025/0018828 A1 Jan. 16, 2025

(30) Foreign Application Priority Data

Dec. 1, 2021 (DE) ..................... 10 2021 213 593.5

(51) Int. Cl.
*B60L 58/12* (2019.01)

(52) U.S. Cl.
CPC .................................... *B60L 58/12* (2019.02)

(58) Field of Classification Search
CPC ..... Y02T 10/70; Y02T 10/7072; Y02T 90/14; B60L 58/12
See application file for complete search history.

(56) References Cited

U.S. PATENT DOCUMENTS

| | | | |
|---|---|---|---|
| 9,041,348 B2 | 5/2015 | Murawaka | |
| 2011/0130885 A1 | 6/2011 | Bowen et al. | |
| 2014/0277872 A1* | 9/2014 | MacNeille ......... | G01C 21/3415 701/22 |

(Continued)

FOREIGN PATENT DOCUMENTS

| | | |
|---|---|---|
| DE | 102012204413 A1 | 9/2013 |
| EP | 2779349 A1 | 9/2014 |

(Continued)

OTHER PUBLICATIONS

Translation of International Search Report for Application No. PCT/EP2022/078785 dated Feb. 15, 2023.

*Primary Examiner* — Justin S Lee
(74) *Attorney, Agent, or Firm* — Michael Best & Friedrich LLP

(57) ABSTRACT

The invention relates to controlling the energy output from an electric vehicle to an external consumer. According to the invention, an energy requirement for reaching a predefined destination or along a predefined route is determined. If the electrical energy stored in the traction battery falls to a critical level, which is required for safely reaching the destination, then the energy output to an external consumer can be stopped. Alternatively, a user can be informed at least of a critical status of this type.

9 Claims, 1 Drawing Sheet

(56) References Cited

U.S. PATENT DOCUMENTS

| | | | | |
|---|---|---|---|---|
| 2014/0285001 | A1* | 9/2014 | Murayama | B60L 58/15 307/9.1 |
| 2015/0054466 | A1* | 2/2015 | Kinomura | B60L 53/68 320/134 |
| 2018/0281773 | A1* | 10/2018 | Bell | B60W 10/08 |
| 2018/0354375 | A1* | 12/2018 | Dao | H01M 10/44 |
| 2019/0120195 | A1* | 4/2019 | King | F02N 11/0807 |
| 2020/0076217 | A1* | 3/2020 | Filippi | B60L 3/0069 |
| 2020/0286305 | A1* | 9/2020 | Diamond | B60W 50/14 |
| 2020/0381923 | A1* | 12/2020 | Chow | H01M 10/4207 |
| 2022/0072962 | A1* | 3/2022 | Maury | B60L 7/10 |

FOREIGN PATENT DOCUMENTS

| | | | |
|---|---|---|---|
| EP | 2830185 | A1 | 1/2015 |
| EP | 3532340 | A1 | 9/2019 |

* cited by examiner

CONTROL DEVICE FOR AN ELECTRIC VEHICLE, ELECTRIC VEHICLE AND METHOD FOR CONTROLLING THE ENERGY OUTPUT OF AN ELECTRIC VEHICLE

BACKGROUND

The present invention relates to a control device for an electric vehicle and an electric vehicle. In particular, the present invention relates to the control of the energy output from the traction battery of an electric vehicle to an external load. The present invention also relates to a method for controlling the energy output from a traction battery to an external load.

Fully or at least partially electrically powered vehicles have an electrical energy storage unit, also known as a traction battery. This traction battery can provide electrical energy that can be used to power the electric vehicle. In addition, the electrical energy from the traction battery can also be used to power other electrical consumers. In addition to internal electrical consumers of the vehicle, such as heating, air conditioning, entertainment system, etc., individual approaches are already known to supply external consumers outside a motor vehicle with electrical energy from the traction battery.

Publication EP 3 532 340 A1 describes an energy management system for a motor vehicle, wherein the motor vehicle has an electrical energy storage unit and a solar cell. The electrical energy storage unit can be charged by an external energy source and/or the solar cell. Furthermore, the electrical energy storage unit can also supply an external consumer with electrical energy.

SUMMARY

The present invention provides a control device for an electric vehicle, an electric vehicle, and a method for controlling the energy output in an electric vehicle with the features of the independent patent claims. Further advantageous embodiments are the subject matter of the dependent claims.

Provided is Therefore:

A control device for an electric vehicle with a traction battery and an energy output device, wherein the energy output device is designed to provide electrical energy to an external consumer. The control device is designed to determine the current state of charge of the traction battery. Furthermore, the control device is designed to determine an energy requirement for a future route of the electric vehicle. In addition, the control device is designed to compare the state of charge of the traction battery with the determined energy requirement for the future route. Finally, the control device is designed to control an energy output to an external consumer using the comparison of the state of charge of the traction battery and the determined energy requirement. Additionally or alternatively, the control device is designed to output a signal using the comparison of the state of charge of the traction battery and the determined energy requirement.

Provided is Furthermore:

An electric vehicle with a traction battery, an energy output device and a control device according to the invention. The energy output device is designed to provide electrical energy from the traction battery to an external consumer.

Provided is Lastly:

A method for controlling the energy output from a traction battery of an electric vehicle to an external load. The method comprises a step for determining the current state of charge of the traction battery. Furthermore, the method comprises a step for determining an energy requirement of the electric vehicle for a future route. The method also comprises a step for comparing the state of charge of the traction battery with the determined energy requirement for the future route. Finally, the method comprises a step for outputting a signal or for controlling an energy output to the external consumer using the comparison of the state of charge of the traction battery with the determined energy requirement.

The present invention is based on the realization that the electrical energy stored in a traction battery of an electric vehicle can also be used to temporarily supply external electrical consumers. The present invention is also based on the realization that the energy stored in a traction battery is limited. Drawing energy from the traction battery therefore reduces the amount of energy available to drive the electric vehicle. This also reduces the maximum range of the electric vehicle.

It is therefore an idea of the present invention to take this realization into account and to monitor the extraction of electrical energy from the traction battery for supplying external consumers. In particular, it is an idea of the present invention to determine the amount of energy required to reach a predetermined destination and then to ensure that sufficient energy remains in the traction battery to reach the desired destination by supplying external electrical consumers.

The future destination, i.e., the next destination to be reached with the electric vehicle, can basically be determined in any way. Some possible approaches for determining, in particular for forecasting potential future destinations are explained in more detail below. However, it is understood that the present invention is not limited to the above-mentioned exemplary approaches for determining or predicting future destinations. Of course, any other approach is also possible to determine future destinations.

The energy required to reach a predetermined destination, in particular the determined future destination, can also be determined in any way. For example, a fixed average energy requirement per route can be used as a basis. In addition, any other approaches are also possible, in particular approaches based on historical consumption data, topographical data to take into account a difference in altitude between the starting point and destination and any other approaches to determine the energy required to reach the predicted destination. Using a determined future destination and the energy required for this, a minimum charge level of the traction battery can be determined, which is required to safely reach the specified destination with the amount of energy provided by the traction battery. If external consumers are supplied from the traction battery and the state of charge of the traction battery is approaching the determined minimum state of charge for safely reaching the destination, suitable measures can be initiated in good time to prevent the traction battery from discharging too much. For example, energy output to external consumers can be deactivated when a critical state of charge is reached, which is at least required to reach the predicted destination. If necessary, a predefined safety margin can also be taken into account so that the external electrical consumers are deactivated at an early stage before the state of charge of the traction battery approaches the minimum state of charge for reaching the destination. In addition or alternatively, signals, such as visual and/or acoustic signals, can also be emitted to inform a user that the state of charge of the traction battery is falling to a level that is at least required to reach a predefined destination due to the supply of external electrical loads. This enables a user to deactivate the external load or at least reduce the power requirement of the connected external load.

The aforementioned measures according to the invention thus make it possible to supply external electrical consumers by an electric vehicle, in particular by the electrical energy stored in the traction battery of the electric vehicle, without running the risk of no longer being able to safely reach a planned destination. For example, the future planned destination may be the position of a charging facility for recharging the traction battery. However, any other destinations, such as a user's home address or similar, are also possible as potential future destinations.

An energy output device within the meaning of the present invention can be understood as any suitable device which is suitable for supplying the energy stored in the traction battery as direct voltage or alternating voltage to an external load. In the simplest case, the DC voltage provided by the traction battery can be supplied directly to an external load. Alternatively, the electrical DC voltage provided by the traction battery can be converted by means of an inverter or voltage converter into an electrical voltage that is suitable for operating the connected external load. In particular, the energy output device can have a suitable connection option in the form of a socket or similar in order to connect the external electrical load.

According to one embodiment, the control device comprises a forecasting device. This forecasting device is designed to determine a future route using a current position of the electric vehicle, a current time, historical usage data of the electric vehicle and/or a user input. For example, the current position of the vehicle, particularly in conjunction with historical usage data, can be used to determine which destination a user is most likely to head for next. For example, a user will most likely head for their home address as their next destination from their workplace. In addition, time-dependent forecasts for a future destination are also possible, for example. For example, it can be assumed that on weekday mornings, a user will preferably go to their workplace. If necessary, corresponding forecasts for future destinations can also be derived at the weekend. For example, it could be deduced from historical user data that a user visits a church on Sunday mornings. Of course, any other approach to forecasting future destinations is also possible. Alternatively, it is of course also possible for a user to specify their desired next destination manually. For example, they can enter their next desired destination into a navigation system when they park the vehicle. Of course, any other approach to determining a future destination is also possible.

According to one embodiment, the control device is designed to output a signal if a difference between the state of charge of the traction battery and the determined energy requirement for the future route falls below a first threshold value. Such signaling can, for example, be visual or acoustic signaling. For example, it is possible to alert a user to a critical drop in the charge level of the traction battery by illuminating the headlights on a vehicle with a predefined time pattern. Furthermore, the activation of the horn, for example, can also signal to a user that the charge level of the traction battery is approaching a critical value during the supply of electrical loads, which is required to reach the future destination. Of course, any other signaling is also possible.

According to one embodiment, the control device is designed to deactivate an energy output to the external load if a difference between the state of charge of the traction battery and the determined energy requirement for the future route falls below a second threshold value. By deactivating the energy output to external consumers, it can be ensured that the traction battery is not discharged too deeply by the external consumers and that the specified or predicted destination can therefore still be reached with the energy stored in the traction battery.

In particular, multi-stage approaches are also possible, in which, for example, a user is first alerted to a critical drop in the traction battery's state of charge at a higher, first threshold value by means of a signal and the load is then deactivated if the state of charge of the traction battery drops further below the second threshold value in order to prevent the traction battery from discharging too deeply.

According to one embodiment, the control device is designed to adjust the first threshold value and/or the second threshold value using a user input, weather conditions, historical consumption values of the electric vehicle and/or a health status of the traction battery. For example, by manually specifying the threshold values or the information corresponding to the threshold values, a user can ensure that the traction battery is not discharged to such an extent that the traction battery is almost completely discharged when the specified destination is reached. In this way, a user can also manually set safety reserves so that sufficient energy is still available for a further journey even when the predicted destination is reached. By taking weather conditions into account, for example, increased consumption values for heating, air conditioning or similar can be taken into account. However, higher air resistance due to rain or other unfavorable weather conditions can also be taken into account to ensure that the minimum amount of electrical energy stored in the traction battery is sufficient to safely reach the predicted destination. Accordingly, the minimum charge level for reaching the predicted destination can also be adjusted by analyzing historical consumption values and evaluating the state of health of the traction battery.

According to one embodiment, the control device is designed to send a notification to a mobile terminal device if the first threshold value and/or the second threshold value is undershot. Such a mobile device can be a smartphone, tablet computer or similar. In this way, a user can be informed when critical threshold values are reached, even if the user is not in the immediate vicinity of the electric vehicle. If necessary, a user can also adjust the automatically determined first or second threshold values using the corresponding terminal device.

According to one embodiment of the electric vehicle, the energy output device of the electric vehicle comprises a voltage converter. This voltage transformer is designed to supply electrical energy to a low-voltage consumer or into a low-voltage network. Such a low-voltage consumer or low-voltage network can be an electrical energy output in the 230 V range. In particular, both single-phase electrical low-voltage consumers and three-phase electrical low-voltage consumers are possible.

The above configurations and developments can be combined with one another in any desired manner if useful. Further configurations, developments and implementations of the invention also comprise not explicitly mentioned combinations of features of the invention described above or below with respect to the exemplary embodiments. The person skilled in the art will in particular also add individual aspects as improvements or additions to the respective basic forms of the invention.

BRIEF DESCRIPTION OF THE DRAWINGS

Further features and advantages of the invention are explained below with reference to the figures. The figures show.

Figure 1:
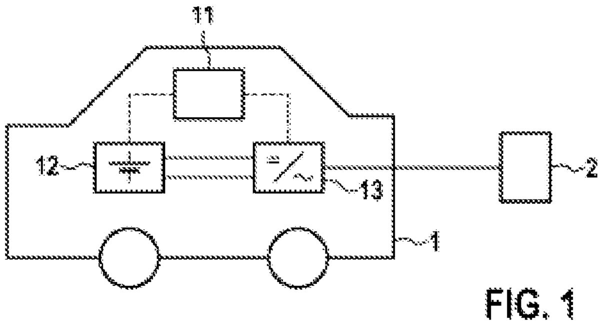
FIG. 1: a schematic representation of an arrangement with an electric vehicle for operating an external load according to one embodiment.

In the drawings, identical reference signs denote identical or functionally identical components, unless stated otherwise.

DETAILED DESCRIPTION

FIG. 1 shows a schematic representation of a schematic diagram with an electric vehicle 1 that supplies electrical energy to an external consumer 2. The electric vehicle 1 comprises a traction battery 12. This traction battery 12 is used, among other things, to provide the electrical energy for operating an electric drive system in the electric vehicle 1. However, the aspect of the electric drive system is not discussed in detail in this application.

In addition, electrical energy can also be supplied from the traction battery 12, for example via a power converter or any other energy output device 13 to an external load 2. For this purpose, the power converter can convert the electrical DC voltage provided by the traction battery 12 into a single-phase or multi-phase electrical AC voltage and provide this AC voltage to the external electrical load 2.

Alternatively, electrical energy can also be drawn directly from the traction battery 12 by an external load 2 via direct current. In this case, the energy output device 13 of the vehicle can, for example, be designed as a contact option for the two poles of the traction battery, as may already be available for charging the traction battery at a DC charging station.

In this sense, the energy output device 13 is to be understood as any type of device which is suitable for providing electrical energy, which is provided in particular by the traction battery 12, for any external consumer 2. As already explained above, in the simplest case this can be a contacting option for drawing electrical energy directly from the traction battery 12. In addition, the energy output device 13 may also comprise an inverter and/or DC voltage converter to convert the DC voltage provided by the traction battery 12 into an electrical voltage suitable for operating the external load 2. Accordingly, the energy output device 13 can also comprise a corresponding connection option, for example in the form of a suitable DC voltage, AC voltage or three-phase socket.

In principle, the external electrical load 2 can be any external electrical load. In particular, electrical loads that are supplied with electrical energy via a low-voltage grid are possible. Such a low-voltage electrical network usually has an effective phase voltage of approx. 230 or, in some countries, 110 volts. In principle, however, electrical loads 2 are also possible, which can be operated with an extra-low voltage of 12 V (DC), for example, the DC voltage from the traction battery voltage or other DC voltages, AC voltages or polyphase AC voltages. All electrical consumers 2 that are not permanently installed in the vehicle 1 are generally regarded as external consumers 2. In particular, external consumers can be connected to the vehicle 1 via an electrical connection point. For example, sockets such as earthed sockets (Schuko sockets) or similar are possible. Multiphase external electrical loads 2 can also be connected via a CEE socket or similar, for example. In addition, it is also conceivable to connect another electric vehicle, wherein, for example, the traction battery of the other electric vehicle can be charged using electrical energy from the traction battery 12 of the electric vehicle. Suitable connection points on the electric vehicle 1 are also possible for such a case, for example.

For example, 2 electrically operated tools such as a drill, saw or similar can be connected as electrical consumers. Lighting elements, such as external spotlights, or household appliances, such as a vacuum cleaner or coffee machine, are also possible. It is understood that any other external electrical loads can also be supplied by the traction battery 12 of the electric vehicle 1 via a suitable connection device.

During operation of the external loads 2, energy is drawn from the traction battery 12 so that the state of charge of the traction battery 12 continuously decreases. This also reduces the maximum range that the electric vehicle 1 can achieve with the energy still stored in the traction battery 12. If too much energy is therefore drawn from the traction battery 12, it may no longer be possible to reach a desired destination with the energy stored in the traction battery 12.

To avoid such a case, a control device 11 is provided which monitors the energy withdrawal from the traction battery 12 to operate the external load 2. For this purpose, the control device 11 can determine the state of charge of the traction battery 12 continuously or at predefined time intervals. For example, a battery management system (BMS) of the traction battery 12 can be read out for this purpose. Of course, any other approach to determining the state of charge or the remaining energy stored in the traction battery 12 is also possible.

Furthermore, the control device 11 can determine a future destination of the electric vehicle 1. For example, the future destination can be understood as the destination that the electric vehicle 1 will head for during its next journey. In the simplest case, such a future target can be specified by a user by means of a suitable user interface. For example, a user can enter the next desired destination into a navigation system of the electric vehicle 1. In this case, the navigation system of the electric vehicle 1 can communicate with the control device 11 and provide the control device 11 with the corresponding data. Depending on the configuration, either the destination specified by the user can be communicated directly to the control device 11. Alternatively, an external navigation system can calculate a route to the specified destination and communicate this route to the control device 11. Furthermore, it is also possible that the navigation system already determines a forecast for the energy consumption for a journey to the destination specified by the user and communicates this energy requirement to the control device 11. If the specific energy requirement for reaching the destination is not already determined by the external navigation system, the control device 11 can calculate this energy requirement independently.

In addition to determining the future destination on the basis of a user specification, any other approach to determining a future destination for the electric vehicle 1 is also possible. For example, a forecasting device 15 can be provided in the control device 11, which forecasts the most probable future destination of the electric vehicle 1. Historical data, for example, can be used for this purpose. For example, previous driving histories can be recorded and the corresponding data stored in a suitable memory. Such historical data can be used to derive regularities, for example, which can then be used to forecast a future destination. For example, the forecast can be made on the basis of time data. If, for example, it is determined that a vehicle always drives to the same destination on working days in the morning hours (e.g., a user's workplace), this destination can be used as the basis for the corresponding time periods. Accordingly, on working days in the afternoon or evening, for example, the user's home address can be used as the destination, which the user travels to after work. In addition, any other habits, such as going to church on Sundays, a regular weekend excursion destination or similar, can be taken from the historical data. In addition, the vehicle can also be controlled on the basis of other information, such as weather data, traffic reports or any other locally determined data or data received via a data interface from an external server.

From the specified or predicted destination, the control device 11 can then determine an expected energy requirement to reach this destination. If necessary, the current local position can also be determined and included in the calculation of the energy requirement for the destination.

In addition, possible charging points for charging the traction battery, in particular charging points in the surroundings of the current position of the electric vehicle 1, can be used as possible destinations. In this way, it can be ensured that the electric vehicle 1, in particular the traction battery 12 of the electric vehicle 1, can be recharged at such a charging point.

Other information, such as weather conditions, historical consumption data, traffic reports or any other data determined or stored locally or provided by a remote server, can also be used to calculate the energy required to reach the specified or predicted target.

The control device 11 then compares the current state of charge of the traction battery 12 with the expected energy requirement for reaching the specified or predicted destination. If it is determined that the energy stored in the traction battery 12 is approaching a level that is required to reach the specified or predicted target, the control device 11 can initiate suitable measures to prevent further discharging of the traction battery 12 or at least to alert a user to the approaching critical state of charge of the traction battery 12.

For example, in a first stage, a user can be informed by suitable signaling that the state of charge of the traction battery 12 is approaching a level that is still required to reach the specified or predicted target as a result of discharging by means of the external loads 2. Such signaling can take place locally, for example, by means of an optical or acoustic signal. For example, a horn or another acoustic signal transmitter of the electric vehicle 1 can be activated. In particular, for example, a characteristic acoustic signal can be emitted to alert the user to the current discharge situation of the traction battery 12. Visual signaling is also possible, for example, by means of a signal light or by activating certain vehicle headlights. For example, predefined vehicle headlights can be activated with a special predefined sequence in order to signal to the user that the charge level of the traction battery 12 is approaching a critical value.

Additionally or alternatively, it is also possible for the control device 11 to deactivate the output of electrical energy to external consumers 2 if the charge level of the traction battery 12 drops to such an extent that it is no longer possible to safely reach the specified or predicted destination.

In particular, a two-stage approach is also possible, in which, for example, visual and/or acoustic signaling takes place in a first step and then the external loads 2 or the energy output to the external loads 2 is deactivated in a second step. For example, suitable threshold values can be specified for this purpose, wherein the threshold value for the visual and/or acoustic signaling is set higher than the threshold value for deactivating the external loads 2.

Figure 2:
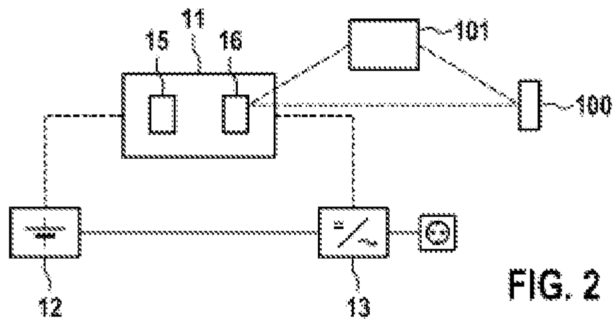
FIG. 2: a schematic representation of an arrangement for operating an external load with a control device according to one embodiment.

FIG. 2 shows a schematic diagram of a schematic diagram of an arrangement for providing electrical energy to an external load 2 with a control device 11 according to one embodiment. All the remarks already made in connection with FIG. 1 apply here. As shown again in detail in FIG. 2, the electrical direct voltage provided by the traction battery 12 can be converted into a corresponding alternating voltage by means of a single-phase or multi-phase inverter. This AC voltage can be supplied to an external load 2. During energy output to an external consumer 2, the charge status of the traction battery 12 is monitored by the control device 11. Furthermore, the energy requirement for a destination specified by a user specification or for a destination predicted by the forecasting device 15 can be determined and compared with the state of charge of the traction battery 12. If the state of charge of the traction battery 12 reaches a value that corresponds to the minimum energy requirement for reaching the specified or predicted destination or is above the calculated energy requirement by a predefined threshold value, an optical and/or acoustic signaling as described above can take place. Furthermore, it is also possible to signal to a user on a mobile terminal 100 when the state of charge drops to a level that is required to safely reach the specified or predicted target. For this purpose, a communication interface 16 for direct communication with a mobile terminal 100 can be provided in the control device 11. Furthermore, communication with the user's mobile terminal 100 can also take place via a connection to an external server 101. In particular, for example, a connection to a mobile terminal 100 is also possible by means of a mobile data connection such as GSM, UMTS, LTE, 5G or similar.

Conversely, the user can also use his mobile device 100 to specify his desired next destination. In addition, the user can also use a mobile terminal 100 or the like to adjust the activation or deactivation of an energy output to an external electrical load 2. For example, a user can use their mobile device 100 to manually deactivate the energy output to the external load 2. It is also possible for a user to continue releasing energy to external consumers 2 via their mobile end device 100 even when the traction battery 12 reaches a critical state of charge. Of course, any other functions that a user performs using their mobile device are also possible.

Figure 3:
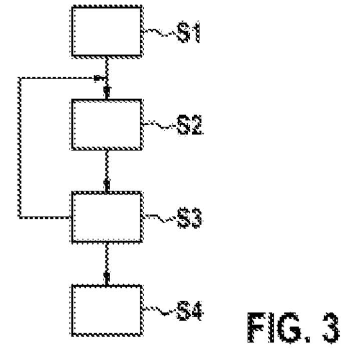
FIG. 3: a flow chart on which a method for controlling an energy output according to one embodiment is based.

FIG. 3 shows a flow diagram of a method for controlling the energy output from a traction battery 12 of an electric vehicle 1 to an external load 2. In principle, the procedure can comprise any of the steps already described above in connection with the electric vehicle 1 and the control device 11 described therein. Similarly, the electric vehicle 1 or the control device 11 can also comprise any components that are required to implement the method described below.

In a step S1, an energy requirement of the electric vehicle 1 for a future route is determined. As described above, the future route or the destination at the end of such a route can be specified by a user input or predicted in any way. In a step S2, the current state of charge of the traction battery 12 is determined.

In a step S3, the state of charge of the traction battery 12 is compared with the determined energy requirement for reaching the destination along the route. A signal can then be output in step S4 or the energy output to the external load 2 can be controlled. In particular, the signaling or control of the energy output takes place using the comparison of the charge level of the traction battery 12 with the determined energy requirement.

In summary, the present invention relates to the control of energy output from an electric vehicle to an external load. According to the invention, an energy requirement for reaching a predefined destination or along a predefined route is determined. If the electrical energy stored in the traction battery falls to a critical level, which is required for safely reaching the destination, then the energy output to an external consumer can be stopped. Alternatively, a user can be informed at least of a critical status of this type.

The invention claimed is:

1. A control device (11) for an electric vehicle (1) having a traction battery (12) and an energy output device (13) for providing electrical energy to an external load (2), wherein the control device (11) is configured:

to determine the current state of charge of the traction battery (12), to determine an energy requirement for a future route, to compare the state of charge of the traction battery (12) and the determined energy requirement for the future route, to use the comparison of the state of charge of the traction battery (12) and the determined energy requirement to control an energy output to the external load (2) and/or to output a signal, to output a control signal, and maintain an energy output at a constant level to the external load (2), if a difference between the state of charge of the traction battery and the determined energy requirement for the future route falls below a first threshold value, and to deactivate an energy output to the external load if a difference between the state of charge of the traction battery and the determined energy requirement for the future route falls below a second threshold value.

2. The control device (11) according to claim 1, wherein the control device (11) comprises a forecasting device (15) which is designed to determine a future travel route using a current position of the electric vehicle (1), a current time, historical usage data of the electric vehicle and/or a user input.

3. The control device (11) according to claim 1, wherein the control device (11) is configured to adjust the first threshold value and/or the second threshold value using a user input, weather conditions, historical consumption values of the electric vehicle (1) and/or a health status of the traction battery (12).

4. The control device (11) according to claim 1, wherein the control device (11) is configured to send a notification to a mobile terminal (100) if the first threshold value and/or the second threshold value is undershot.

5. The control device (11) according to claim 1, wherein the external load (2) comprises an electrical load external to the electric vehicle (1).

6. The control device (11) according to claim 1, wherein the first threshold value is greater than the second threshold value.

7. An electric vehicle (1) comprising:

a traction battery (12);

a power output device (13) adapted to provide electrical power from the traction battery (12) to an external load (2); and a control device (11) according to claim 1.

8. The electric vehicle (1) according to claim 7, wherein the energy output device (13) comprises a voltage converter designed to provide electrical energy to a low-voltage consumer or in a low-voltage network.

9. A method for controlling the energy outputs from a traction battery (12) of an electric vehicle (1) to an external load (2), the method comprising:

determining (S1), via a control device, an energy requirement of the electric vehicle (1) for a future route;

determining (S2), via the control device, a current state of charge of the traction battery (12);

comparing (S3), via the control device, the state of charge of the traction battery (12) with the determined energy requirement for the future route;

outputting (S4), via the control device, of a signaling and/or control of an energy output to the external load (2) using the comparison of the state of charge of the traction battery (12) with the determined energy requirement;

outputting a control signal, and maintaining an energy output at a constant level to the external load (2), if a difference between the state of charge of the traction battery and the determined energy requirement for the future route falls below a first threshold value; and deactivating an energy output to the external load if a difference between the state of charge of the traction battery and the determined energy requirement for the future route falls below a second threshold value.

* * * * *